(12) United States Patent
Ill

(10) Patent No.: US 12,285,105 B2
(45) Date of Patent: Apr. 29, 2025

(54) PULL-OUT GUIDE

(71) Applicant: Fulterer AG & Co KG, Lustenau (AT)

(72) Inventor: Bernhard Ill, Hohenweiler (AT)

(73) Assignee: Fulterer AG & Co KG, Lustenau (AT)

( * ) Notice: Subject to any disclaimer, the term of this patent is extended or adjusted under 35 U.S.C. 154(b) by 83 days.

(21) Appl. No.: 18/037,018

(22) PCT Filed: Sep. 20, 2021

(86) PCT No.: PCT/EP2021/075828
§ 371 (c)(1),
(2) Date: May 15, 2023

(87) PCT Pub. No.: WO2022/100911
PCT Pub. Date: May 19, 2022

(65) Prior Publication Data
US 2023/0404259 A1   Dec. 21, 2023

(30) Foreign Application Priority Data

Nov. 16, 2020 (AT) .................................. A 252/2020

(51) Int. Cl.
*A47B 88/487* (2017.01)
*A47B 88/423* (2017.01)
(Continued)

(52) U.S. Cl.
CPC .......... *A47B 88/423* (2017.01); *A47B 88/477* (2017.01); *A47B 88/487* (2017.01);
(Continued)

(58) Field of Classification Search
CPC ... A47B 88/423; A47B 88/477; A47B 88/487; A47B 88/493; A47B 88/2088;
(Continued)

(56) References Cited

U.S. PATENT DOCUMENTS

| | | |
|---|---|---|
| 4,065,196 A | 12/1977 | Stein |
| 4,765,699 A | 8/1988 | Bessinger et al. |
| 2018/0092462 A1* | 4/2018 | Chen .................... A47B 88/493 |

FOREIGN PATENT DOCUMENTS

| | | | |
|---|---|---|---|
| CH | 679735 A5 | 4/1992 | |
| EP | 1795088 A1 * | 6/2007 | ............. A47B 88/57 |

(Continued)

OTHER PUBLICATIONS

International Search Report (ISR) and Written Opinion for International Application No. PCT/EP2021/075828 mailed Jan. 20, 2022, English Translation of ISR is included, 11 pages.

*Primary Examiner* — Phillip A Johnson
(74) *Attorney, Agent, or Firm* — Dickinson Wright PLLC

(57) ABSTRACT

A pull-out guide for pulling a pull-out furniture part out of a furniture carcass has a first rail and a second rail, wherein the pulling out of the first rail is limited by a stop element of the first rail striking against a pull-out stop of the second rail. A securing part is mounted movably on the second rail and is adjustable between a release position, in which, for complete removal of the first rail, the first rail is pivotable relative to the second rail to such an extent that the stop element can be disengaged from the pull-out stop, and a locking position. The securing part is mounted displaceably, over a displacement path extending from the locking position to the release position, in a displacement direction that encloses an angle of less than 20° with the direction counter to the pull-out direction.

18 Claims, 5 Drawing Sheets

(51) Int. Cl.
*A47B 88/477* (2017.01)
*F16C 29/04* (2006.01)

(52) U.S. Cl.
CPC ...... *F16C 29/04* (2013.01); *A47B 2088/4235* (2017.01); *F16C 2314/72* (2013.01)

(58) Field of Classification Search
CPC .. A47B 88/4235; F16C 2314/72; F16C 29/04; F16C 29/045
See application file for complete search history.

(56) References Cited

FOREIGN PATENT DOCUMENTS

| | | |
|---|---|---|
| GB | 202526 | 8/1923 |
| GB | 345539 | 3/1931 |
| GB | 801225 | 9/1958 |
| GB | 1335776 | 10/1973 |

\* cited by examiner

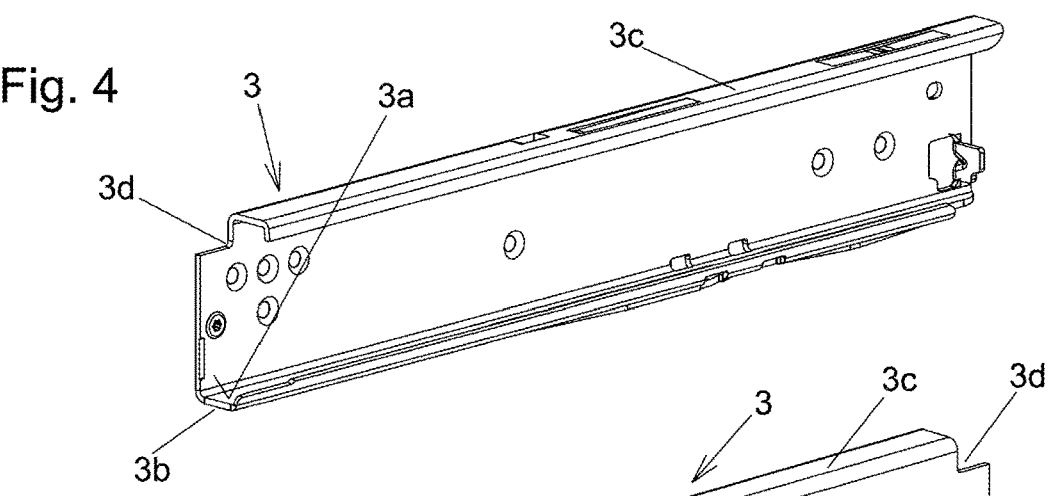
Fig. 4
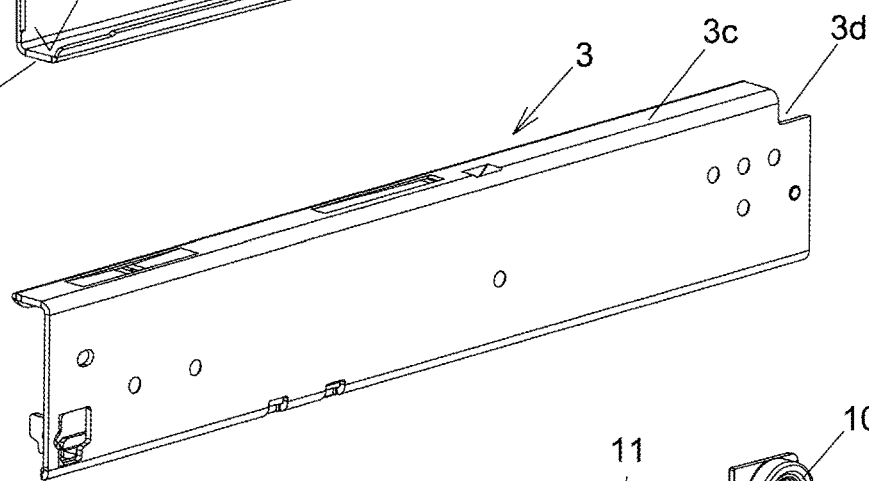
Fig. 5
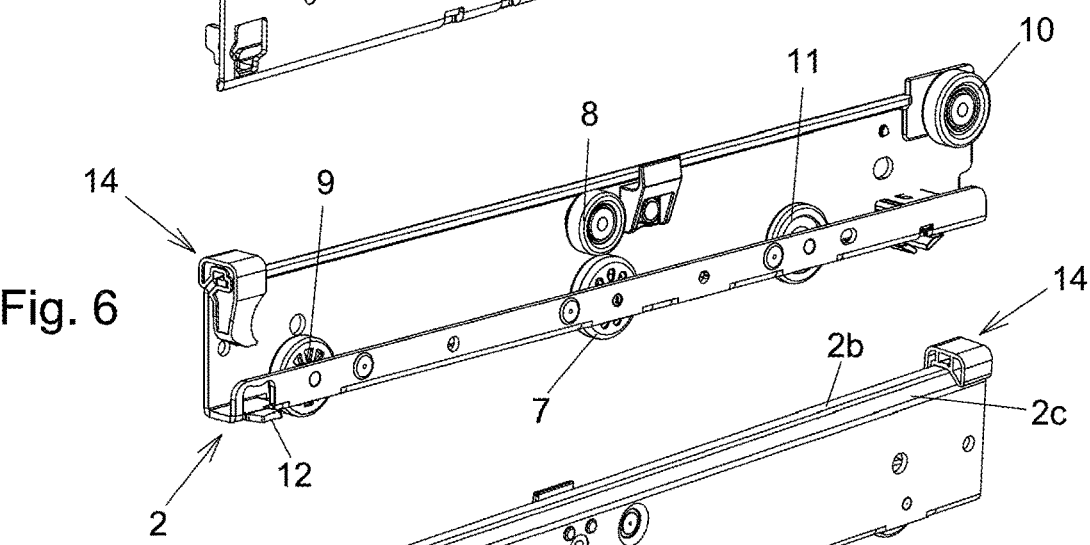
Fig. 6
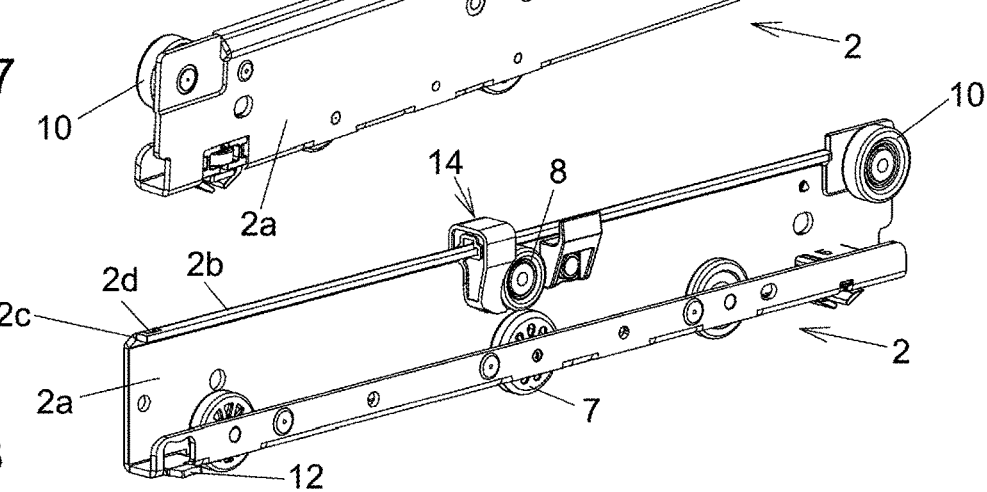
Fig. 7
Fig. 8

PULL-OUT GUIDE

This U.S. national phase patent application claims priority to PCT patent application no. PCT/EP2021/075828, filed Sep. 20, 2021, which claims the benefit of Austria (AT) patent application no. A 252/2020, filed Nov. 16, 2020, the entire contents of which is incorporated herein by reference in its entirety.

BACKGROUND

1. Technical Field

The invention relates to a pull-out guide for pulling a pull-out furniture part out of a furniture carcass, comprising a first rail and a second rail, wherein the first rail can be pulled out from the second rail in a pull-out direction starting from an inserted position into a pulled-out position in which any further pulling out of the first rail from the second rail is limited by a stop element of the first rail striking against a pull-out stop of the second rail, and wherein a securing part is movably mounted on the second rail, which is adjustable between a release position in which, for complete removal of the first rail from the second rail starting from the pulled-out position of the first rail, the first rail can be pivoted whilst raising the front end of the first rail with respect to the second rail (2) to such an extent that the stop element of the first rail can be disengaged from the pull-out stop of the second rail and can be moved over the pull-out stop of the second rail, and a locking position in which the pivoting of the first rail whilst raising the front end of the first rail is at least blocked to such an extent that the stop element of the first rail located in the pulled-out position is held in engagement with the pull-out stop.

2. Related Art

Pull-out guides of the type mentioned initially are deduced from GB 1 335 776 B and GB 801 255 B. These pull-out guides comprise a first rail in the form of a pull-out rail or drawer rail, a second rail in the form of a middle rail and a third rail in the form of a carcass rail and is configured as a differential pull-out guide with a load-transferring differential roller mounted rotatably in a central region of the middle rail. When pulling out the pull-out rail from the middle rail, this pulling-out is limited by a stop element of the pull-out rail striking against a pull-out stop of the middle rail. When the pull-out rail is to be completely removed from the middle rail, a securing part rotatably mounted on the middle rail is twisted against the force of a spring element from a locking position into a release position. In the locking position the securing element blocks any raising of a front end of the pull-out rail. In the release position the front end of the pull-out rail can be raised and the stop element of the pull-out rail can thus be guided over the pull-out stop of the middle rail and the pull-out rail removed from the middle rail. Conversely the pull-out rail can be inserted into the middle rail, for example, during assembly of the pull-out guide. A disadvantage here consists in that for insertion of a drawer on which left and right pull-out rails are mounted, the securing parts of both middle rails must be adjusted simultaneously against the force of the spring element into the release position and the drawer must be inserted in these positions of the securing elements which can only be accomplished with some difficulty by one person. The same applies to the removal of the drawer with the pull-out guides mounted thereon from the middle rails.

A similar pull-out guide is deduced from GB 202,526 B. Here however, the securing part is not urged into the locking position by a spring element but is held frictionally in the existing rotational position about the axis of rotation. When closing the drawer, the faceplate of the drawer approaches the securing part and adjusts this into the locking position. For this purpose however, the faceplate of the drawer and the middle rail must be mounted in precisely the correct relationship to one another, otherwise the securing part is not adjusted correctly into the locking position when closing the drawer. In practice however, such a precise relationship cannot be easily maintained when mounting the pull-out guide on the drawer. For example, in freezing furniture with thick sealing lips, there is also the problem here that the pull-out guide (with self-closing mechanism) compresses the sealing lips variously strongly depending on the loading and thus different settings exist.

The same applies to the pull-out guide known from EP 1 795 088 A1. The securing part can be twisted and displaced here with respect to an axle journal. When the faceplate of the drawer approaches the securing part when closing the drawer, this displaces the securing part with respect to the axle journal, with the result that a shoulder of the securing part and the retaining surface of the middle rail engage and the securing part is blocked from any rotation about the axis of rotation.

In the pull-out guide known from GB 345,539 B the securing part is also pivotable and displaceable about an axle journal. When the pull-out guide is closed in the release position of the securing part, the securing part approaches a flange of the carcass rail and is thereby pivoted about the axis of rotation into the locking position and displaced with respect to the axis of rotation so that a pin attached to the middle rail is inserted into a recess of the securing part and the securing part is blocked against any rotation about the axis of rotation. If, as a result of the mounting of the pull-out guide on the drawer, the faceplate of the drawer strikes against the furniture carcass before the pull-out rail is completely inserted into the middle rail, the blocking of the securing part against any rotation about the axis of rotation is not achieved.

CH 679735 A5 and U.S. Pat. No. 4,065,196 A disclose pull-out guides in which the pull-out stop of the middle rail itself is pivotable in order to guide the stop element of the pull-out rail past the pull-out stop of the middle rail.

SUMMARY

It is the object of the invention to provide an advantageous pull-out guide of the type mentioned initially which is characterized by an easy operation and reliable function. According to the invention, this is achieved by a pull-out guide having the features of claim 1.

In the pull-out guide according to the invention, the securing part is mounted displaceably on the second rail over a displacement path extending from the locking position into the release position in a displacement direction, which encloses an angle of less than 20°, preferably less than 10°, with the direction opposite to the pull-out direction. In this case, the pivotability of the first rail with respect to the second rail whilst raising the front end of the first rail over the displacement path of the securing part starting from the locking position as far as into the release position increases continuously until, in the release position of the securing part, the first rail can be pivoted whilst raising the front end of the first rail with respect to the second rail to such an extent that the stop element of the first rail can be disengaged from the pull-out stop of the second rail. The first rail can thus be completely removed from the second rail.

When the first rail is pivoted in the pulled-out position whilst raising the front end of the first rail, this pivoting takes place about an axis formed by a support point of the first rail with respect to the second rail, wherein this support point is formed in particular by a roller of the second rail.

In an expedient embodiment of the invention, the displacement direction over the entire displacement path lies parallel to the pull-out direction.

In another expedient embodiment of the invention, the displacement direction over the entire displacement path is directed so that the securing part is raised over the entire displacement path starting from the locking position as far as the release position with respect to an imaginary displacement parallel to the pull-out direction.

Preferably the displacement of the securing part over the entire displacement path takes place rectilinearly. The movement of the securing part then favourably comprises a pure translation.

In a further possible embodiment of the invention, the displacement direction could also change over the displacement path, for example, over a first section of the displacement path starting from the locking position it could lie parallel to the pull-out direction and over a following section of the displacement path it could be directed so that the securing part is raised with respect to an imaginary displacement parallel to the pull-out direction. In this case, the movement of the securing part from the locking position into the release position could comprise, in addition to a translation, a certain rotation, in particular about a horizontal axis at right angles to the axis of rotation. Such a rotation would however preferably be less than 5°.

When the vertical distance between a contact surface of the securing part and a horizontal web of the first rail which comes in contact with this contact surface when pivoting the first rail whilst raising the front end of the first rail, remains the same between the locking position and the release position of the securing part, the greater pivotability of the front end of the first rail with respect to the second rail can only be brought about by the different distance of the securing part from the axis about which the pivoting takes place.

It would also be feasible and possible that the section of the first rail which, in the pulled-out position of the first rail and in the release position of the securing part, comes in contact with the contact surface during pivoting of the first rail whilst raising the front end of the first rail, is lower than that section of the first rail which, in the pulled-out position of the first rail and in the locking position of the securing part, comes in contact with the contact surface of the securing part during pivoting of the first rail whilst raising the front end of the first rail.

Preferably it is provided that the displacement path from the locking position of the securing part as far as into the release position of the securing path extends over at least a fifth of the longitudinal extension of the second rail. It can be provided that the securing part is displaceable between the locking position and the release position over at least a quarter or even over at least a third of the longitudinal extension of the second rail with respect to the second rail.

One possible embodiment of the invention provides that the securing part in the locking position is located in a front third of the longitudinal extension of the second rail and in the release position is located in a middle third of the longitudinal extension of the second rail. Such a configuration is in particular expedient when the displacement direction runs parallel to the pull-out direction over the entire displacement path.

The displaceability of the securing part with respect to the second rail contrary to the displacement direction is more favourably limited by a displacement stop on reaching the locking position, wherein in an advantageous embodiment of the invention, this displacement stop is formed by a spring tongue of the locking part which cooperates with a stop surface arranged on the second rail. As a result, easy mounting on the second rail and optionally also dismounting of the securing part from the second rail can be possible.

In an advantageous embodiment of the invention, in addition to the first and second rail, the pull-out guide has a third rail from which the second rail can be pulled out and into which the second rail can be inserted. The second rail is therefore arranged between the first and third rail. The third rail can be attached to a furniture carcass and the first rail can be attached to a pull-out furniture part. The third rail could also be designated as carcass rail, the second rail as middle rail and the first rail as pull-out rail (or also drawer rail). In particular in such a configuration it is provided that during displacement of the first rail with respect to the second rail the second rail moves synchronously with respect to the third rail. Such pull-out guides are also designated as synchronous pull-outs or differential pull-outs. Favourably here the second rail has a rotatably mounted load-transferring differential roller in a central region of its longitudinal extension which has a play in the vertical direction with respect to the second rail and rolls between a track of the first rail and a track of the third rail. Such differential pull-out guides are fundamentally known. Advantageously here all the rollers are arranged on the middle rail.

Favourably during insertion of the second rail into the third rail starting from a state in which the second rail is located in the pulled-out position and the securing part is located in the release position, a section of the third rail which is preferably located in the region of the front end of the third rail can approach the securing part and, when inserting the second rail into the inserted position, displace the securing part into the locking position. The securing part is thus brought automatically into the locking position when actuating the pull-out guide.

When "front" and "rear" is mentioned in this document, this is related to the pull-out direction.

BRIEF DESCRIPTION OF THE DRAWINGS

Further advantages and details of the invention are explained hereinafter with reference to the appended drawing. In the figures:

FIGS. 4 and 5 show oblique views of the third rail from various viewing directions;

FIGS. 6 and 7 show oblique views of the second rail from various viewing directions in the locking position of the securing part;

FIG. 8 shows an oblique view of the second rail similar to FIG. 6 but in the release position of the securing part;

DETAILED DESCRIPTION OF EXAMPLE EMBODIMENTS

Figure 2:
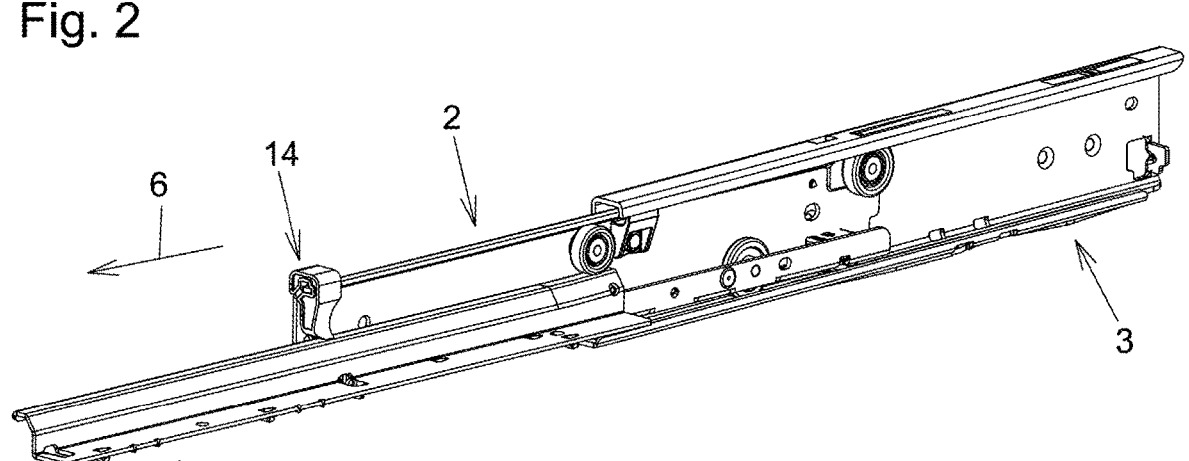
FIG. 2 shows an oblique view similar to FIG. 1 in the open position of the pull-out guide.
Figure 1:
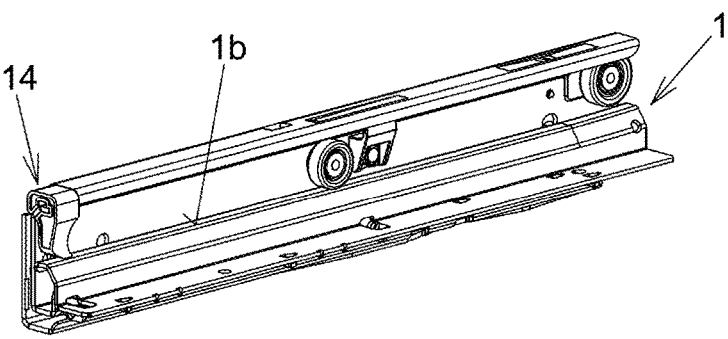
FIG. 1 shows an oblique view of a first exemplary embodiment of a pull-out guide according to the invention in the closed position of the pull-out guide and locking position of the securing part.
Figure 3:
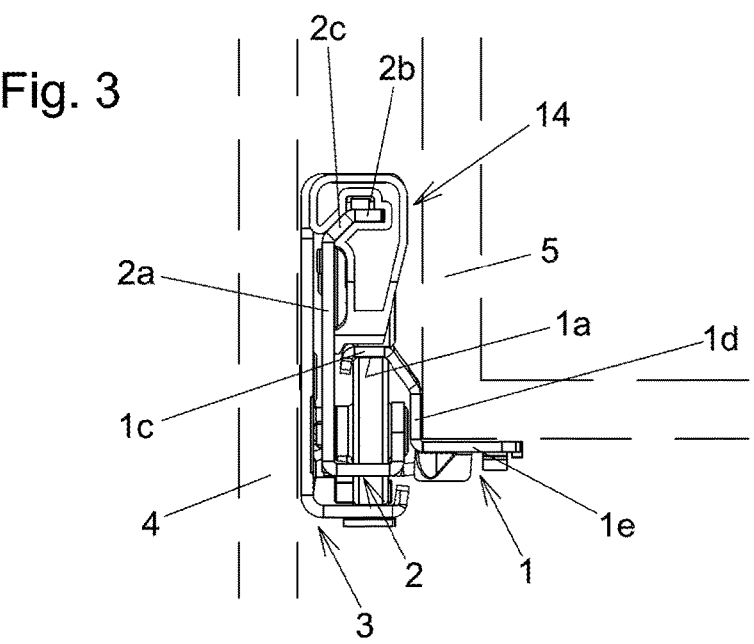
FIG. 3 shows a front-side view of the pull-out guide wherein parts of a furniture body and a pull-out furniture part are indicated by dashed lines.
Figure 9:
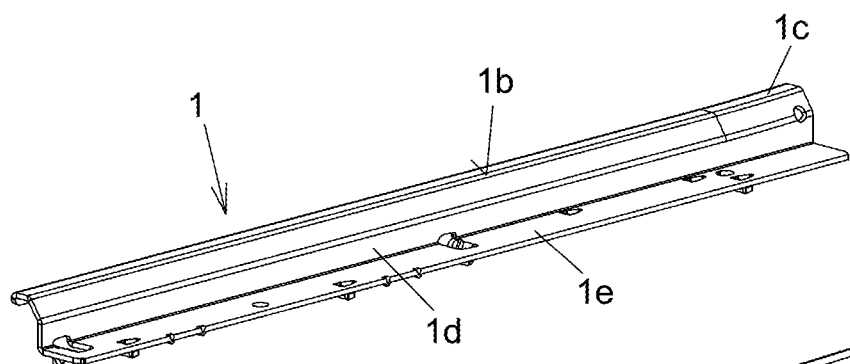
FIGS. 9 and 10 show oblique views of the first rail from various viewing directions.
Figure 10:
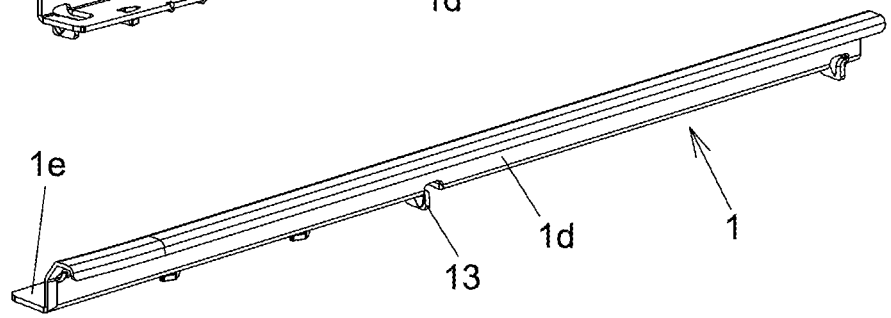
Figure 11:
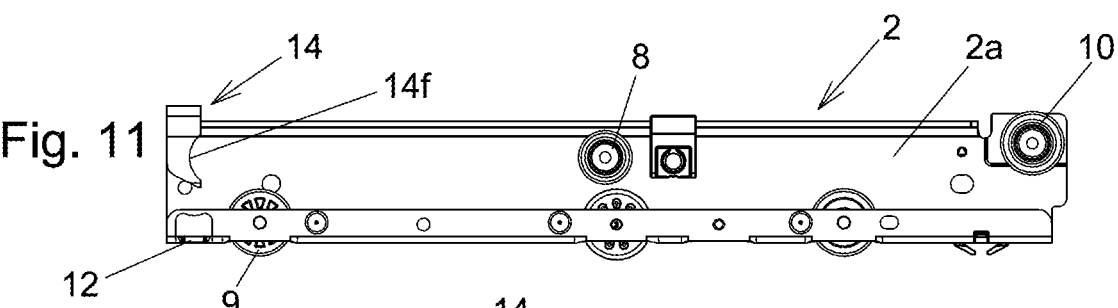
FIGS. 11 and 12 show side views of the second rail in the locking position and release position of the securing part.
Figure 12:
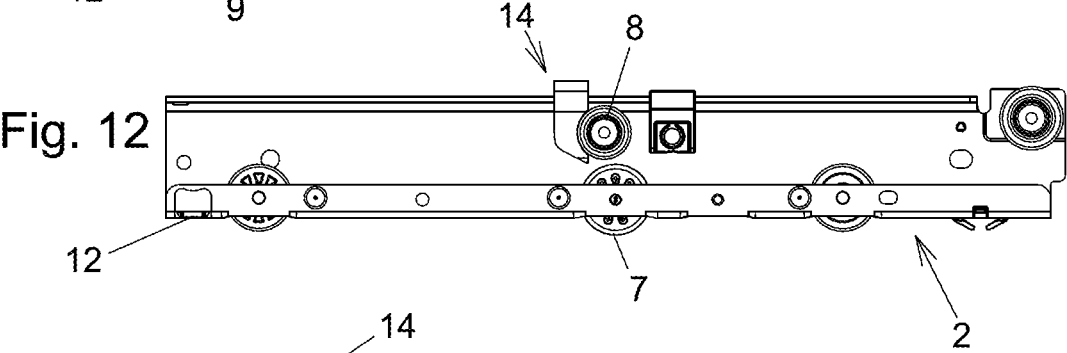
Figure 13:
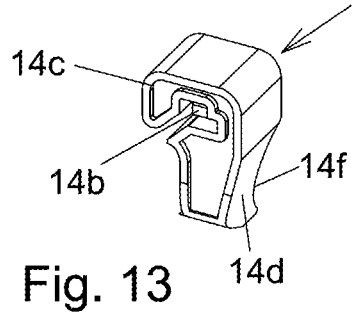
FIGS. 13 and 14 show oblique views of the securing part from various viewing directions.
Figure 14:
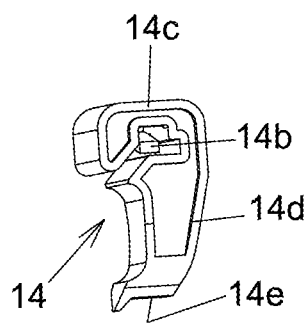
Figure 15:
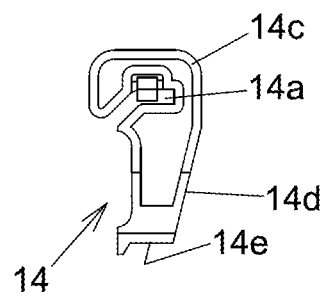
FIG. 15 shows a view of the securing part.
Figure 19:
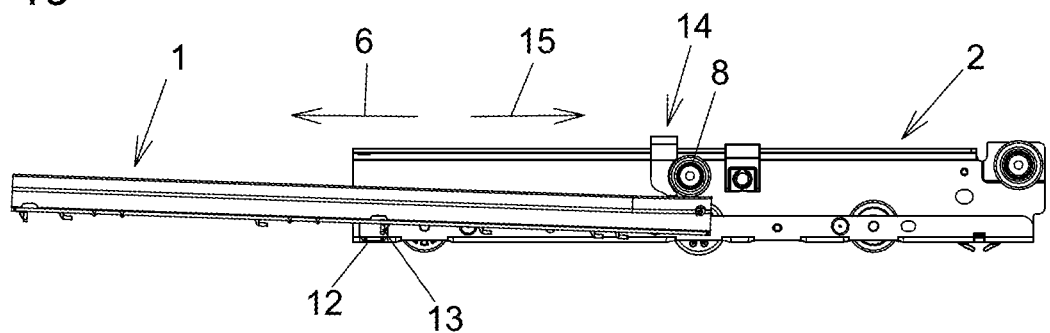
FIGS. 16 to 19 show diagrams of the first and second rail in side view to explain the process of removing the first rail from the second rail.

A first exemplary embodiment of a pull-out guide according to the invention is explained hereinafter with reference to FIGS. 1 to 20. The pull-out guide is configured as a roller pull-out. In a roller pull-out rollers which bring about the mutual displaceable guidance of the rails are mounted rotatably on rails. The pull-out guide comprises a first rail 1, a second rail 2 and a third rail 3, wherein in the exemplary embodiment all the rollers are mounted rotatably on the second rail. The third rail 3 is used for attachment to a furniture carcass 4 of which only a section is shown by dashed lines in FIG. 3. The first rail 1 is used for attachment to a pull-out furniture part 5, for example, a drawer of which only a section is shown by dashed lines in FIG. 3. The third rail 3 could also be designated as carcass rail, the second rail 2 as middle rail and the first rail 1 as pull-out rail.

In the exemplary embodiment, the pull-out furniture part rests on a horizontal web 1e which is connected to the lower end of the vertical web 1d of the first rail 1. The horizontal web 1e could also be omitted and the pull-out furniture part 5 could be attached to the vertical web 1d.

The rails 1-3 are guided synchronously, i.e. when pulling out the first rail 1 from the second rail 2 in a pull-out direction 6, the second rail 2 is displaced synchronously with respect to the third rail 3 in the pull-out direction 6. With respect to the third rail 3 in this case the second rail 2 covers half the distance of the first rail 1.

A differential roller 7 arranged rotatably on the second rail 2 in the central region of its longitudinal extension is used for synchronous guidance of the rails 1 to 3, which differential roller rolls between a downwardly directed track 1a of the first rail 1 arranged on the underside of a horizontal web 1c of the first rail 1 and an upwardly directed track 3a of the third rail 3 arranged on the upper side of a lower horizontal web 3b of the third rail 3 and thereby transfers at least a part of the load of the first rail 1 directly onto the third rail 3. The differential roller 7 has some play in the vertical direction here. Such pull-outs are known as "differential pull-outs".

The horizontal web 1c is connected to the upper end of the vertical web 1d of the first rail 1.

Located in a central region of the longitudinal extension of the second rail 2 above the differential roller 7, in the exemplary embodiment somewhat offset towards the front with respect to the differential roller 7 is a support roller 8 which can support the rear end of the first rail 1 in the pulled-out position of the first rail 1 in the upward direction.

In the exemplary embodiment, as already mentioned, all the rollers are arranged on the second rail 2 as is preferred in differential pull-out guides. In particular, a roller 9 cooperating with the downwardly directed track 1a of the first rail 1 and in the inserted position of the second rail 2 cooperating with the upwardly directed track 3a of the third rail 3 is located in the region of the front end of the second rail 2 and a roller 10 cooperating with a downwardly directed track of the third rail 3 arranged on the underside of an upper horizontal web 3c of the third rail 3 is located in a rear region of the second rail 2. An auxiliary roller 11 is preferably rotatably mounted in the region between the differential roller 7 and the rear end of the second rail 2, which supports the rear end of the first rail 1 downwards in the inserted position of the first rail 1.

A pull-out stop 12 of the second rail 2, to which a stop element 13 of the first rail approaches in the pulled-out position of the first rail 1, is used to limit the pulling-out of the first rail 1 with respect to the second rail 2 in the pulled-out position of the first rail 1. Furthermore, a securing part 14 is arranged on the second rail 2 which is explained in detail in the following and which, in the locking position, prevents the front end of the first rail 1 being able to be raised to such an extent that the stop element 13 can be guided over the pull-out stop 12.

The pulling-out of the second rail 2 with respect to the third rail 3 and the insertion of the first rail 1 into the second rail 2 and the second rail 2 into the third rail 3 are also limited by stops which can be configured according to the prior art and are not explained in detail at this point.

In the closed position of the pull-out guide the first rail 1 has its inserted position in which it is completely inserted into the second rail 2 and the second rail 2 has its inserted position in which it is completely inserted into the third rail 3. In the open position of the pull-out guide the first rail 1 has its pulled-out position in which it is completely pulled out from the second rail 2 and the second rail 2 has its pulled-out position in which it is completely pulled out from the third rail 3.

In an upper and front section of the second rail 2, in the exemplary embodiment, a securing part 14 is mounted displaceably parallel to the longitudinal extension of the second rail 2, i.e. parallel to the pull-out direction 6. In a locking position, the securing part 14 is this exemplary embodiment is located in the front third of the longitudinal extension of the second rail 2, preferably directly at the front end of the second rail 2. This locking position can be seen from FIGS. 1, 2, 6, 7, 11, 16 and 17. In a release position, the securing part 14 in this exemplary embodiment is located in the middle third of the longitudinal extension of the second rail 2. In this case, as depicted the securing part 14 in the release position can rest against the front side of the support roller 8. The release position can be seen from FIGS. 8, 12, 18 and 19.

In the exemplary embodiment the displacement of the securing part 14 from the locking position into the release position is therefore accomplished rectilinearly over a displacement path in a displacement direction 15 located parallel to the pull-out direction and opposite to this. The displacement direction 15 is horizontal here when the lower edge of the second rail 2 lies horizontally (this is the usage position of the pull-out guide).

For the displaceable mounting of the securing part 14 this has a channel 14a which passes through the securing part 14 parallel to the displacement direction 15 which accommodates an upper section of the second rail 2.

In the exemplary embodiment the second rail 2 has a vertical web 2a on which the rollers 7-11 are rotatably mounted, an upper horizontal web 2b and an oblique connecting web 2c which connects the upper horizontal web 2b to the vertical web 2a. The channel 14a receives the upper horizontal web 2b and the connecting web 2c.

The securing part 14 has a spring tongue 14b which lies inside the channel 14a. Remote from the locking position of the securing part 14 the spring tongue 14b rests on the upper side of the upper horizontal web 2b of the second rail 2 and is resiliently pressed onto this. The frictional force which must be overcome for displacement of the securing part 14 with respect to the second rail 2 is thus increased by this spring tongue 14b. A certain holding of the securing part 14 in the release position is thereby achieved. In the locking position of the securing part 14, the spring tongue 14b engages in an opening 2b (which can be seen in FIG. 8) in the horizontal web 2b of the second rail 2. In the locking position of the securing part 14, the spring tongue 14b directed with its end towards the front end of the second rail 2 rests against the front end of this opening 2d in the upper horizontal web 2b of the second rail 2 which forms a stop surface which limits the displacement of the securing part 14 with respect to the second rail 2 in the pull-out direction 6. A displacement stop for limiting the displacement of the securing part 14 with respect to the second rail 2 in the pull-out direction is thereby formed.

If a complete dismounting of the securing part 14 from the second rail 2 is desired, the spring tongue 14b can be raised (through the opening 2d in the vertical web 2a) in order to disengage this from the stop surface. During mounting of the securing part 14 on the second rail 2, the spring tongue 14b is raised automatically when pushing the securing part 14 onto the front end of the second rail 2.

Instead of an opening, a recess could also be provided in the second rail 2, whose front end forms the stop surface.

The spring tongue could also be arranged outside the channel 14a and, for example, press against the underside of the upper horizontal web 2b or against a side surface of the vertical web 2a when the securing part 14 is located outside the locking position.

The channel 14a is located in a head section 14c of the securing part 14. From this an arm extension 14d of the securing part 14 projects downwards. The lower end of this arm extension 14d forms a contact surface 14e. This cooperates with a support surface 1b of the first rail 1 which is formed by the upper side of the horizontal web 1c of the first rail 1. In a horizontal side view viewed at right angles to the pull-out direction, when the front end of the first rail 1 is not raised, the horizontal web 1c of the first rail 1 extends parallel to the pull-out direction 6, cf. FIGS. 15 and 16.

If the first rail 1 is pivoted with respect to the second rail 2 in the pulled-out position of the first rail 1, whereby the front end of the first rail 1 is raised, the support surface 1b of the first rail 1 comes to rest against the contact surface 14e. The pivoting of the first rail 1 whilst raising the front end of the first rail 1 is accomplished about the support point of the track 1a on the differential roller 7 as axis. In the locking position of the securing part 14 the pivoting of the first rail 1 with respect to the second rail 2 whilst raising the front end of the first rail 1 is only possible insofar as the stop element 13 of the first rail 1 remains in engagement with the pull-out stop 12 of the rail 2.

If the securing part 14 on the second rail 2 is displaced starting from the locking position in the displacement direction, i.e. pushed back contrary to the pull-out direction 6, the vertical path covered by the section of the support surface 1b of the first rail 1 which cooperates with the stop surface 14e of the securing part 14 with the same raising of the front end of the first rail 1 (i.e. with the same pivoting angle) is reduced. That is, if the horizontal web 1c in the non-raised state of the first rail 1 has a constant vertical distance from the lower end of the securing part 14 over its longitudinal extension, the front end of the first rail 1 can be raised all the further, the further the securing part 14 is displaced backwards with respect to the second rail 2. At least in the release position of the securing part 14, the front end of the first rail 1 can be raised so far that the stop element 13 of the first rail 1 can be moved over the pull-out stop 12 of the second rail 2.

Figure 18:
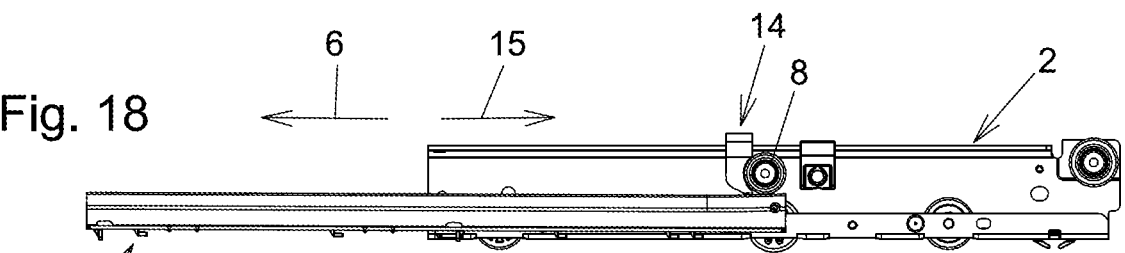
Figure 17:
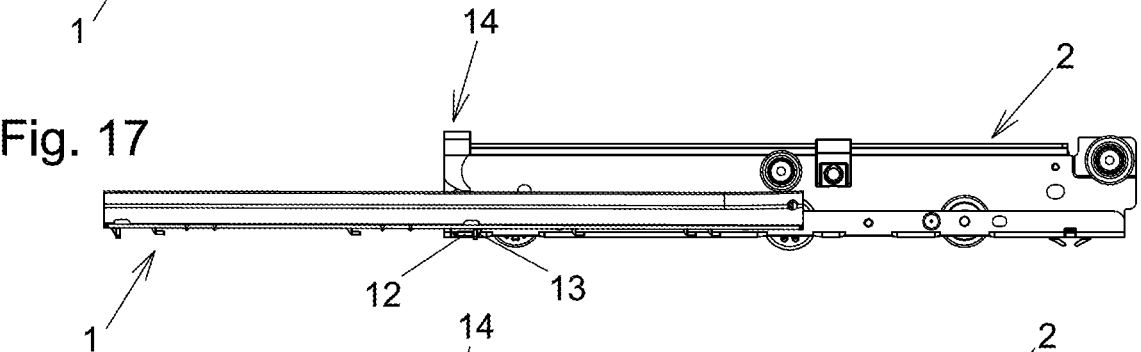
Figure 16:
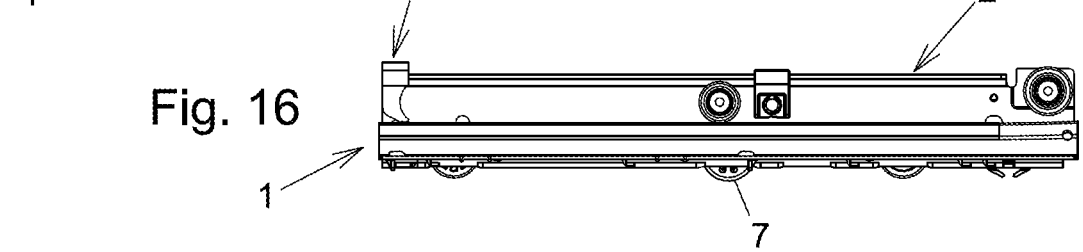

The removal of the first rail 1 from the second rail 2 is shown in FIGS. 16 to 19. Starting from FIG. 16 in which the first rail is located in its inserted position, the first rail 1 is pulled out into its pulled-out position in which the stop element 13 of the first rail 1 strikes against the pull-out stop 12 of the second rail 2, cf. FIG. 17. In this case, the securing part 14 is located in the locking position. The securing part 14 is consequently pushed back into the release position, c.f. FIG. 18. The front end of the first rail 1 is now raised and the stop element 13 of the first rail 1 is guided over the pull-out stop 12 of the second rail 2, cf. FIG. 19. Thus, the first rail 1 can be withdrawn completely from the second rail 2 (=removed from the second rail 2).

Conversely the first rail 1 removed from the second rail 2 can be inserted in the second rail 2 when the securing part 14 is located in the release position. With the front end of the first rail 1 raised, the rear end of the first rail 1 is inserted between the differential roller 7 and the support roller 8 whereby the stop element 13 of the first rail 1 is moved over the pull-out stop 12 of the second rail 2.

Figure 20:
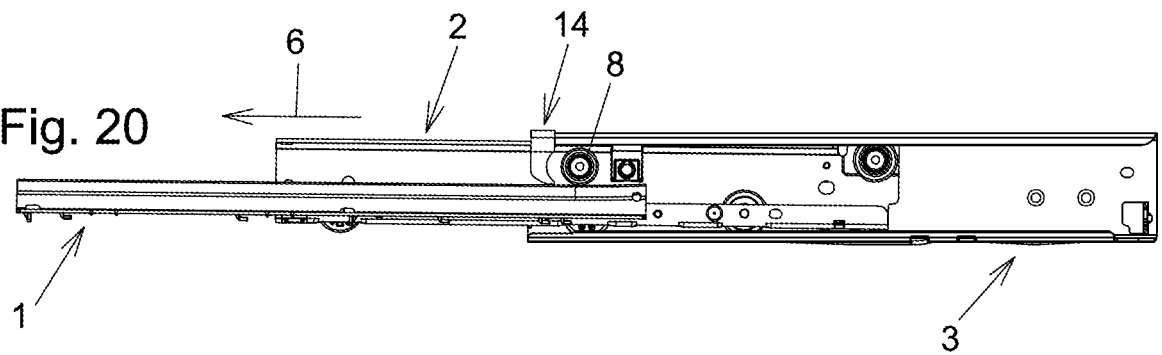
FIG. 20 shows a side view of the pull-out guide when pushing together the pull-out guide when the securing part is initially in the release position.

When inserting the first rail 1 into the second rail 2, the second rail 2 is usually inserted into the third rail 3 and is located in its pulled-out position. The adjustment of the securing part 14 from the release position into the locking position can thus be accomplished automatically when the second rail 2 is inserted into the third rail 3 and the pull-out guide is completely closed. As shown in FIG. 20, in this case the front end of an upper section of the third rail 3 approaches the head section 14c of the securing part 14 and during insertion of the second rail 2 into the third rail 3, the securing part 14 is hereby displaced into the locking position.

The upper section of the third rail 3 has a section 3d at the front end of the third rail 3 which accommodates the securing part 14 in the closed position of the pull-out guide. The second rail 2 can thereby be completely inserted into the third rail 3.

The rear side of the arm extension 14a of the securing part 14 has a partially cylindrical indentation 14f which accommodates a front section of the support roller 8 in the release position of the securing part 14. The contact surface 14e can thus be brought as close as possible to the support point of the upper horizontal web 1c on the differential roller 7. As a result, the play by which the front end of the first rail 1 can be raised in the locking position of the securing part 14 can be kept small.

As a result of the securing part 14 located in the release position, the support roller 8 is also protected from any damage by the first rail 1, when during insertion of the first rail 1 into the second rail 2 the first rail 1 is set too high and the first rail 1 would run against the support roller 8 with its front edge if the securing part were not present. In conventional pull-out guides without a securing part according to the invention, a sheet-metal tongue is usually stamped out from the profile of the second rail and bent upwards in the region in front of the support roller, which serves to protect the support roller. Such a configuration is superfluous here.

A second exemplary embodiment of the invention is explained hereinafter with reference to FIGS. 21 to 24. Apart from the differences described hereinafter, the configuration of the second exemplary embodiment is fundamentally that of the first exemplary embodiment and the description of the first exemplary embodiment and the possible combinations thereof can be used for this purpose in a similar manner in this respect.

FIGS. 21 to 24 only show the first rail 1 and the second rail 2 similarly to FIGS. 16 to 19. The third rail 3 is configured to be the same as in the first exemplary embodiment.

The difference between this exemplary embodiment and the previously described first exemplary embodiment consists substantially in that the securing part in the release position is pushed less far backwards and that the displacement direction 15 in which the displacement of the securing part 14 is made during pivoting from the locking position into the release position is at an angle to the pull-out direction 6. The displacement direction 15 is aligned in such a manner in this case that the securing part 14 moves somewhat upwards during displacement from the locking position into the release position when the lower edge of the second rail 2 lies horizontally, i.e. when the pull-out direction 6 lies horizontally. The angle 16 between the direction opposite the pull-out direction 6 and the displacement direction 15 is less than 20° in this case, preferably less than 10°. This angle 16 can be 5° or less.

The sloping alignment of the displacement direction 15 is achieved in the exemplary embodiment whereby the upper edge of the vertical web 2a is displaced from front to back over the region via which the securing part 14 is displaced during adjustment from the locking position into the release position. The contact surface 14e thus lies higher in the release position than in the locking position of the securing part 14 and thus the vertical distance of the contact surface 14e of the securing part 14 from the horizontal web 1c of the first rail 1 increases continuously from the locking position as far as the release position. The pivotability of the first rail 1 with respect to the second rail 2 whilst raising the front end of the first rai 1 therefore increases continuously over the displacement path of the securing part starting from the locking position as far as into the release position. In the exemplary embodiment in which the displacement of the securing part runs rectilinearly over the entire displacement path from the locking position as far as into the release position, the pivotability of the first rail 1 with respect to the second rail 2 whilst raising the front end of the first rail 1 is proportional to the displacement path covered starting from the locking position.

In this exemplary embodiment, the securing part 14 in the locking position is again located in the region of the front end of the second rail 2. In the release position in this exemplary embodiment however, it is located in a central region between the front end of the second rail 2 and the support roller 8. However, the securing part could on the other hand also be located further to the rear in the release position, even so far to the rear that it is located in contact with the support roller 8.

Figure 24:
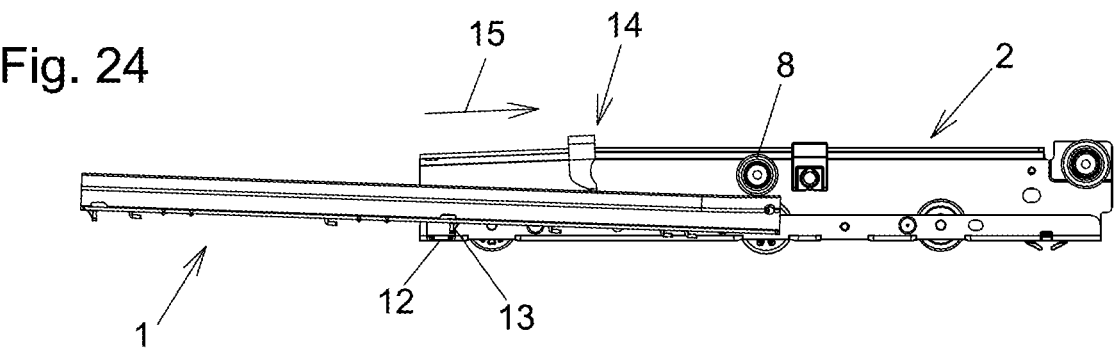
FIG. 24 shows a diagram corresponding to FIG. 23 wherein the first rail is pivoted with respect to the second rail whilst raising the front end of the first rail.
Figure 23:
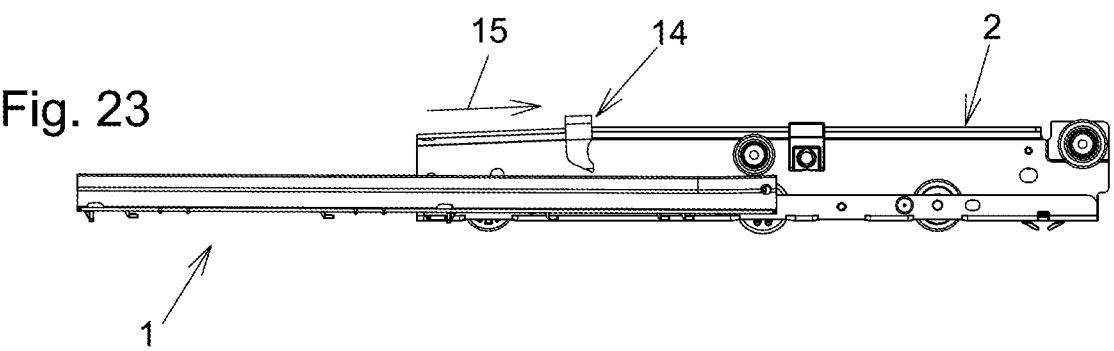
FIG. 23 shows a side view in the pulled-out position of the first rail and in the release position of the securing part.
Figure 22:
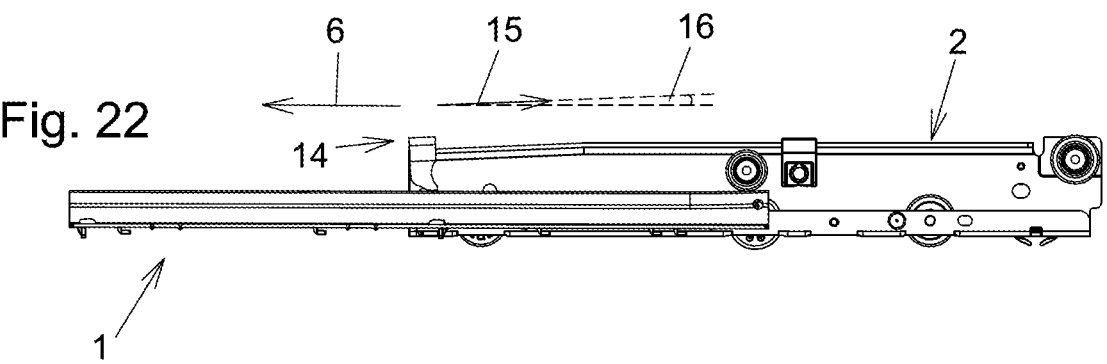
FIGS. 21 and 22 show diagrams of the first and second rail similar to FIGS. 16 and 17 for a second exemplary embodiment of the invention.
Figure 21:
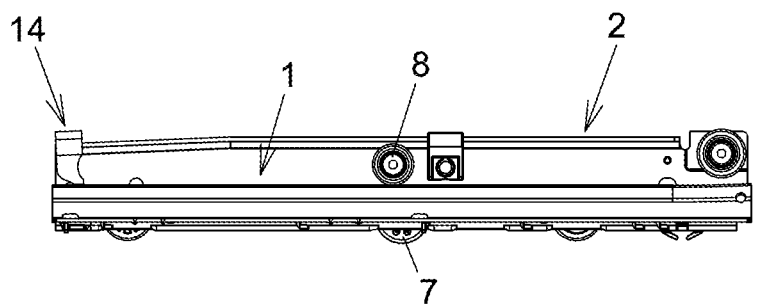

FIG. 21 shows the inserted state of the first rail 1 and FIG. 22 shows the pulled-out state of the first rail 1, wherein the securing part is located in the locking position. In FIG. 23 the securing part is displaced in the displacement direction as far as into the release position. In FIG. 24 the first rail 1 is pivoted whilst raising the front end of the first rail 1 until the support surface 1b of the first rail 1 rests against the contact surface 14e of the securing part 14 so that the stop element 13 can be moved over the pull-out stop.

In a further modified embodiment of the invention, starting from the locking position of the securing part 14, a section of the displacement path which initially extends parallel to the pull-out direction, in particular horizontally, could be provided, which is adjoined by an ascending section of the displacement path over which the displacement direction therefore includes an angle 16 not equal to 0° with the direction opposite to the pull-out direction.

It is also feasible and possible that the ascent of the displacement path from front to back changes, i.e. for example a section of the displacement path lying parallel to the pull-out direction is initially present following the locking position, which goes over continuously into an ascending section of the displacement path.

The advantage of a section of the displacement path 15 lying parallel to the pull-out direction 6 following the locking position is that a risk of an unintentional displacement of the securing part 14 starting from the locking position in the direction of the release position, for example, due to repeated raising of the front end of the first rail 1, is reduced. Accordingly, it could even be provided that a very first section of the displacement path 15 starting from the locking position in the direction of the release position is initially configured to be slightly descending and then goes over into a horizontally running section of the displacement path which is adjoined possibly by an ascending section of the displacement path or goes over straight away into an ascending section of the displacement path.

The invention claimed is:

1. A pull-out guide for pulling a pull-out furniture part out of a furniture carcass, comprising a first rail and a second rail, wherein the first rail can be pulled out from the second rail in a pull-out direction starting from an inserted position into a pulled-out position in which any further pulling out of the first rail from the second rail is limited by a stop element of the first rail striking against a pull-out stop of the second rail, and wherein a securing part is movably mounted on the second rail, the securing part is adjustable between a release position in which, for complete removal of the first rail from the second rail starting from the pulled-out position of the first rail, the first rail is be pivoted whilst raising the front end of the first rail with respect to the second rail to such an extent that the stop element of the first rail is be disengaged from the pull-out stop of the second rail and can be moved over the pull-out stop of the second rail, and a locking position in which the pivoting of the first rail whilst raising the front end of the first rail is at least blocked to such an extent that the stop element of the first rail located in the pulled-out position is held in engagement with the pull-out stop, wherein the securing part is mounted displaceably on the second rail over a displacement path extending from the locking position into the release position in a displacement direction, that encloses an angle of less than 20°, with the direction opposite to the pull-out direction, wherein the pivotability of the first rail with respect to the second rail whilst raising the front end of the first rail increases continuously over the displacement path of the securing part starting from the locking position as far as into the release position.

2. The pull-out guide according to claim 1, wherein the securing part is located in the locking position in the region of the front end of the second rail.

3. The pull-out guide according to claim 1, wherein the displaceability of the securing part with respect to the second rail contrary to the displacement direction is limited by a displacement stop upon reaching the locking position.

4. The pull-out guide according to claim 3, wherein in order to form the displacement stop, the securing part has a spring tongue that cooperates with a stop surface arranged on the second rail.

5. The pull-out guide according to claim 4, wherein the spring tongue is pressed resiliently against a surface of the second rail extending parallel to the displacement direction remote from the locking position.

6. The pull-out guide according to claim 4, wherein the securing part has a channel passing through the securing part parallel to the displacement direction that accommodates an upper section of the second rail, wherein the spring tongue of the securing part is arranged inside the channel.

7. The pull-out guide according to claim 6, wherein during insertion of the second rail into the third rail starting from a state in which the second rail is located in the pulled-out position and the securing part is located in the release position, a section of the third rail approaches the securing part and when the second rail is inserted into the inserted position, the second rail displaces the securing part into the locking position.

8. The pull-out guide according to claim 1, wherein the pull-out guide has a third rail, wherein the second rail can be pulled out from the third rail in the pull-out direction starting from an inserted position into a pulled-out position, wherein in the inserted position of the first and second rail a closed position of the pull-out guide and in the pulled-out position of the first and second rail an open position of the pull-out guide exists.

9. The pull-out guide according to claim 8, wherein the second rail has a rotatably mounted load-transferring differential roller that has a play in the vertical direction with respect to the second rail and rolls between a track of the first rail and a track of the third rail.

10. The pull-out guide according to claim 9, wherein the securing part in the release position abuts with a rear side against a support roller arranged above the differential roller.

11. The pull-out guide according to claim 10, wherein the rear side of the securing part has an indentation which in the release position of the securing part receives a front section of the support roller.

12. The pull-out guide according to claim 8, wherein during movement of the first rail with respect to the second rail the second rail moves synchronously with respect to the third rail.

13. The pull-out guide according to claim 1, wherein the securing part has a contact surface that comes into contact with the first rail, when the first rail is pivoted with respect to the second rail whilst raising the front end of the first rail at a support surface formed by the upper side of a horizontal web of the first rail.

14. The pull-out guide according to claim 13, wherein the horizontal web of the first rail extends parallel to the pull-out direction without pivoting of the first rail with respect to the second rail whilst raising the front end of the first rail.

15. The pull-out guide according to claim 1, wherein the displacement direction lies parallel to the pull-out direction.

16. The pull-out guide according to claim 1, wherein the pivotability of the first rail with respect to the second rail whilst raising the front end of the first rail over the displacement path of the securing part starting from the locking position as far as into the release position increases proportionally to the displacement path covered.

17. The pull-out guide according to claim 1, wherein the displacement path extends from the locking position of the securing part as far as into the release position of the securing part over at least a fifth of the longitudinal extension of the second rail.

18. The pull-out guide according to claim 1, wherein the angle is less than 10°.

* * * * *